US009413637B2

(12) United States Patent
Keesara et al.

(10) Patent No.: US 9,413,637 B2
(45) Date of Patent: Aug. 9, 2016

(54) ARCHITECTURE FOR VIRTUALIZATION AND DISTRIBUTION OF ROUTING INFORMATION USED IN A TRANSPORT NETWORK

(71) Applicants:Srikanth Keesara, Tewksbury, MA (US); Rama Suryanarayana Appala, Nashua, NH (US); Gautam Khera, Walpole, MA (US)

(72) Inventors: Srikanth Keesara, Tewksbury, MA (US); Rama Suryanarayana Appala, Nashua, NH (US); Gautam Khera, Walpole, MA (US)

(73) Assignee: Avaya Inc., Basking Ridge, NJ (US)

( * ) Notice: Subject to any disclaimer, the term of this patent is extended or adjusted under 35 U.S.C. 154(b) by 406 days.

(21) Appl. No.: 13/656,862

(22) Filed: Oct. 22, 2012

(65) Prior Publication Data
US 2014/0112188 A1 Apr. 24, 2014

(51) Int. Cl.
*H04L 12/761* (2013.01)
*H04L 12/751* (2013.01)
*H04L 12/715* (2013.01)
*H04L 12/721* (2013.01)
*H04L 12/753* (2013.01)

(52) U.S. Cl.
CPC .............. *H04L 45/16* (2013.01); *H04L 45/02* (2013.01); *H04L 45/04* (2013.01); *H04L 45/12* (2013.01); *H04L 45/48* (2013.01)

(58) Field of Classification Search
CPC . H04L 12/185; H04L 12/465; H04L 12/4633; H04L 12/4641; H04L 12/4658; H04L 12/4662; H04L 43/0811; H04L 43/10; H04L 45/02; H04L 45/12; H04L 45/24; H04L 45/44; H04L 45/48; H04L 45/586; H04L 45/66; H04L 45/70; H04L 65/4076
See application file for complete search history.

(56) References Cited

U.S. PATENT DOCUMENTS

| 2006/0088031 | A1* | 4/2006 | Nalawade ..................... 370/390 |
| 2007/0286093 | A1* | 12/2007 | Cai et al. ....................... 370/254 |
| 2012/0016974 | A1* | 1/2012 | Bartholomay ...... H04L 41/5041 709/221 |
| 2013/0021942 | A1* | 1/2013 | Bacthu et al. ................. 370/254 |

OTHER PUBLICATIONS

Previdi et al., IS-IS Multi-Instance: draft-ietf-isis-mi-08.txt; IETF; Oct. 17, 2012.*
Fedyk et al., IS-IS Extensions Supporting IEEE 802.1 aq Shortest Path Bridging, IETF, Apr. 2012.*
Pryzygienda et al.; RFC 5120; M-ISIS: Multi Topology (MT) Routing in Intermediate System to Intermediate Systems (IS-ISs); IETF, Feb. 2008.*
Fedyk et al., IS-IS Extensions Supporting IEEE 802.1aq Shortest Path Bridging: draft-ietf-isis-ieee-aq-05.txt, IETF, Mar. 8, 2011.*
Previdi et al.; IS-IS Multi-Instance: draft-ietf-isis-mi-05.txt; IETF; Oct. 30, 2011.*

* cited by examiner

*Primary Examiner* — Benjamin H Elliott, IV
*Assistant Examiner* — Eric Nowlin

(57) ABSTRACT

A method, apparatus and computer program product for distribution of routing information used in a transport network is presented. In a transport network having a plurality of edge devices and core devices, a main instance of a protocol is used for shortest path and tree computation. A multicast tree is defined per Virtual Services Network (VSN) to distribute Link State Data Base (LSDB) updates that only apply to members of said VSN. Multicast trees are built using a secondary instance of the control protocol LSDB and wherein each VSN multicast tree represents a separate instance of the secondary instance of the control protocol LSD. LSDB updates are distributed that only apply to members of the VSN using the multicast tree for the VSN.

20 Claims, 2 Drawing Sheets ered design. Though originally an ISO standard, the IETF republished the protocol as an Internet Standard in RFC 1142. IS-IS has been called the de facto standard for large service provider network backbones.

ARCHITECTURE FOR VIRTUALIZATION AND DISTRIBUTION OF ROUTING INFORMATION USED IN A TRANSPORT NETWORK

BACKGROUND

Data communications networks have become ubiquitous. A typical data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants (PDAs), tablets and other types of consumer electronics connect to and transmit/receive data over the communication network and, hence, are users of the communication services offered by the communication network.

Network elements (e.g. Access Points (APs), mobility switches, edge switches, bridges and the like) are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. The packets are transferred across the network in accordance with a particular protocol, such as the Internet Protocol (IP).

One type of network is known as a Shortest Path Bridging (SPB) network. SPB technology provides logical Ethernet networks on native Ethernet infrastructures using a link state protocol to advertise both topology and logical network membership. Packets are encapsulated at the edge either in Media Access Control (MAC)-in-MAC 802.1ah or tagged 802.1Q/802.1ad frames and transported only to other members of the logical network. Unicast and multicast are supported and all routing is on symmetric shortest paths. Many equal cost shortest paths are supported.

Intermediate System To Intermediate System (ISIS) is a routing protocol designed to move information efficiently within a computer network, a group of physically connected computers or similar devices. ISIS accomplishes this by determining the best route for packets through a packet-switched network. The protocol was defined in ISO/IEC 10589:2002 as an international standard within the Open Systems Interconnection (OSI) reference design. Though originally an ISO standard, the IETF republished the protocol as an Internet Standard in RFC 1142. IS-IS has been called the de facto standard for large service provider network backbones.

SPB uses ISIS as the control protocol to transfer routing information between devices in an SPB Network acting as a transport network between access networks which may be running different protocols. In an SPB network, the ISIS Link State Database (LSDB) is used to advertise routing information. In addition to information about adjacencies with other SPB enabled devices the LSDB also includes reachability information for services outside the SPB network. Examples are—IPv4 unicast routes, IPv4 Multicast Routes, IPv6 unicast routes, IPv6 multicast routes, L2 virtual Service networks (VSNs), Unicast Backbone Media Access Control (BMAC) addresses etc.

SUMMARY

Conventional mechanisms such as those explained above suffer from a variety of deficiencies. Traditional approaches for solving similar problems in the past have involved using two or more protocols within the transport network. For example, a protocol like Border Gateway Protocol (BGP) is used to exchange routing information for which the use of an Internal Gateway Protocol (example OSPF, ISIS, etc.) would be considered sub optimal or not suitable. BGP has good scaling properties and over time has been adapted to carry advertisements for a variety of services. There are several reasons though as to why the use of BGP between BEBs in a SPB network is not optimal. This arrangement introduces another protocol that the operator has to configure and manage. It does not work natively at Layer-2 (L2). IP reachability needs to be established before route exchanges can begin. This also means that multiple network layer protocols need to converge before traffic settles down when network events occur—resulting in slower convergence. BGP sessions are point-to-point and typically require peer configuration for each session. A large number of BGP sessions is not only difficult to configure, but can also add to the processing load on the switch/router.

Most of the information in the LSDB is used at edge of the SPB network where the services are hosted. This information is not required in the core. There are a few problems with using the SPB ISIS LSDB to carry this information. One problem is limited database size. Each node can advertize a maximum of 256 LSPs each with a maximum size of 1500 bytes. This limits the amount of information that can be advertised (limits number of routes, streams, Service Instance Identifiers (I-SIDs), etc). There is no isolation, in a multi tenant environment there exists a limited LSDB size, which means that a large routing table for one customer means that there is less room in the LSDB to advertise routes for another customer. Another problem is referred to as control plane chatter. A bulk of the information in the LSDB changes in response to events external to the SPB network and are only relevant at the edge. The control plane in the core of the network is still involved in relaying these updates across the network. It would be good to limit the chatter to nodes hosting the service. Still another problem is Type Length Value (TLV) standardization. As SPB is extended to cover different flavors of traffic, each one of them requires IETF to assign TLV numbers. In the case of virtualized services (VRFs), this will require additional TLV types/sub-type to be assigned for the Default Routing instance and the VRFs. It would be good to not have to assign separate TLVs for VRFs.

It would be desirable to provide a way to distribute control plane information in a SPB network that does not increase the computational load on the SPB control plane relative to current SPB designs. It would also be desirable to preserve the operational simplicity of SPB (e.g., a single protocol for all services, minimal configuration). Another desirable characteristic would be to significantly lift the LSDB size limitations, while also allowing routing information for a VSN customer to grow without restricting available LSDB space for other customers. It would further be desirable to eliminate needless control plane chatter in the network.

Embodiments of the invention significantly overcome such deficiencies and provide mechanisms and techniques that provide virtualization and distribution of routing information used in SPB networks. The present invention utilizes a per VSN multicast trees for virtualization of ISIS-SPB LSDB and propagation of routing updates and datapath speeds.

In a particular embodiment of a method for providing virtualization and distribution of routing information used in a transport network, the method includes using a main instance of a protocol for shortest path and tree computation in a transport network having a plurality of edge devices and core devices. The method also includes defining a multicast tree per Virtual Services Network (VSN) to distribute Link State Data Base (LSDB) updates that only apply to members of the VSN. The method further includes building the multicast tree using a secondary instance of the control protocol LSDB and wherein each VSN multicast tree represents a separate instance of the secondary instance of the control protocol LSDB. Additionally, the method includes distributing LSDB updates that only apply to members of the VSN using the multicast tree for the VSN.

Other embodiments include a computer readable medium having computer readable code thereon for providing virtualization and distribution of routing information used in a transport network. The computer readable medium includes instructions for using a main instance of a protocol for shortest path and tree computation in a transport network having a plurality of edge devices and core devices. The computer readable medium also includes instructions for defining a multicast tree per Virtual Services Network (VSN) to distribute Link State Data Base (LSDB) updates that only apply to members of the VSN. The computer readable medium further includes instructions for building the multicast tree using a secondary instance of the control protocol LSDB and wherein each VSN multicast tree represents a separate instance of the secondary instance of the control protocol LSDB. Additionally, the computer readable medium includes instructions for distributing LSDB updates that only apply to members of the VSN using the multicast tree for the VSN.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides virtualization and distribution of routing information used in SPB networks as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing virtualization and distribution of routing information used in SPB networks as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
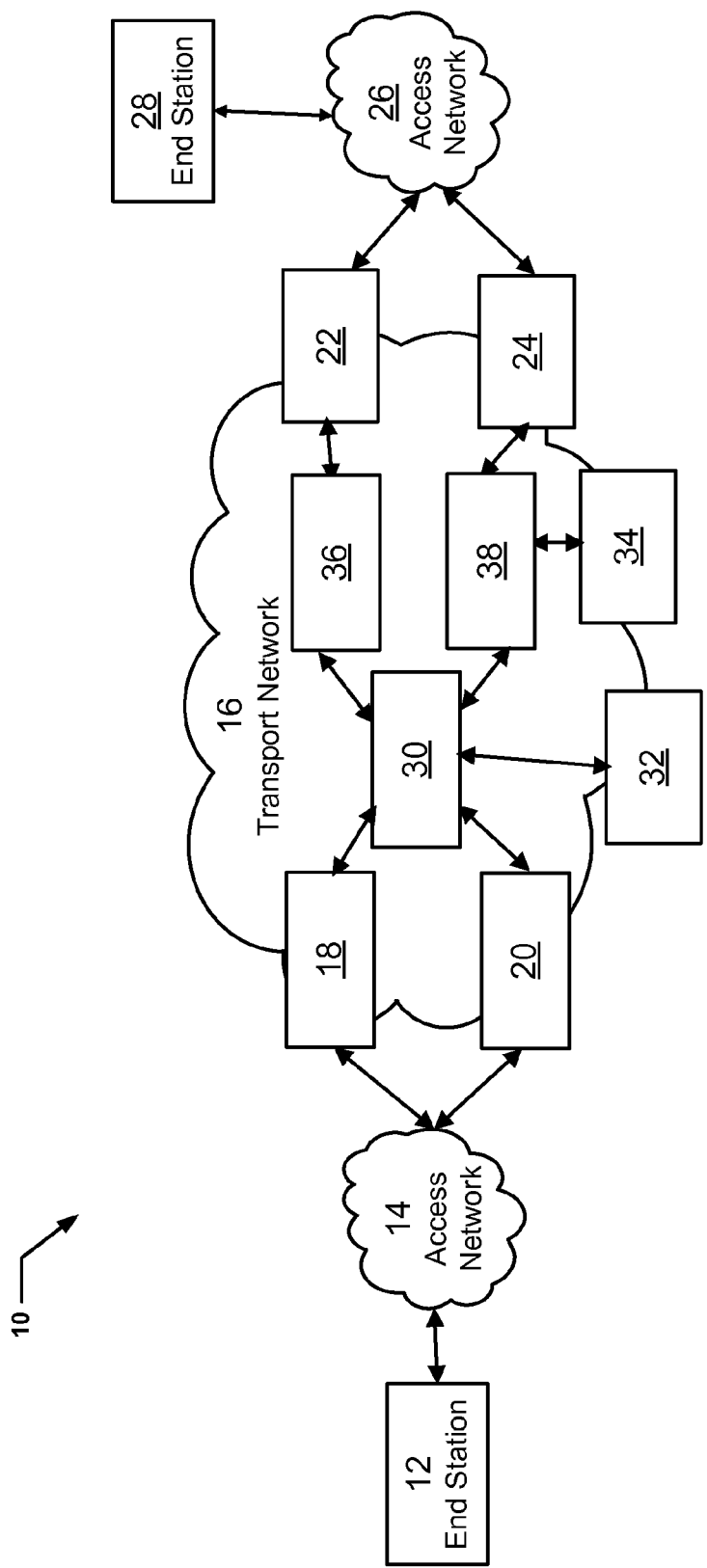
FIG. 1 illustrates a block diagram of a data communication network that provides virtualization and distribution of routing information used in transport networks in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

FIG. 1 illustrates an environment 10 wherein a first access network 14 and a second access network 28 are interconnected by way of a transport network 16. Transport network 16 in this example is a Shortest Path Bridging (SPB) network. The transport network 16 includes a group of network devices, 18, 20, 22, 24, 30, 32, 34, 36 and 38.

Network devices 18, 20, 22, 24, 32 and 34 are herein referred to as Backbone Edge Bridges (BEBs or edge devices) while network devices 30, 36 and 38 are herein referred to as Backbone Core Bridges (BCBs or core devices). A packet transmitted from an edge station 12 through access network 14 destined for edge station 28 through access network 26 would enter transport network 16 via BEB 20, be forwarded to BCB 30, be forwarded to BCB 38, forwarded to BEB 24 then to access network 26.

SPB combines an Ethernet data path (either IEEE 802.1Q in the case of SPB, or Provider Backbone Bridges (PBBs) IEEE 802.1ah in the case of SPBM) with an IS-IS link state control protocol running between Shortest Path bridges (NNI links). The link state protocol is used to discover and advertise the network topology and compute shortest path trees from all bridges in the SPB Region. Topology data is the input to a calculation engine which computes symmetric shortest path trees based on minimum cost from each participating node to all other participating nodes. The shortest path trees are then used to populate forwarding tables for each participating node.

In SPB as with other link state based protocols, the computations are done in a distributed fashion. Each node computes the Ethernet compliant forwarding behavior independently based on a normally synchronized common view of the network (at scales of about 1000 nodes or less) and the service attachment points (UNI ports). Ethernet filtering Database (or forwarding) tables are populated locally to independently and deterministically implement its portion of the network forwarding behavior.

The presently described method and apparatus for virtualization and distribution of routing information in a transport network utilizes multiple instances of ISIS. One of these instances is the main ISIS-SPB instance which is responsible for shortest path and tree computations and is fully compliant with the standard IEEE-802.1aq specification. The other instances of ISIS are referred to in this invention as lightweight ISIS instances and are used as described below.

In particular, a multicast tree per VSN is used. This can be a Global Routing Table (GRT), a L2VSN or a aL3VSN. The I-SID used for this multicast tree is the same as I-SID used to represent the VSN in the SPB network. A separate ISIS instance is associated with each VSN. Each of these per VSN ISIS instances uses the same system-id as the main ISIS-SPB instance. The multicast tree of the VSN is used to distribute routing information for the VSN. There is no need to run any topology computation in the ISIS instances associated with each VSN. The cost information needed run prefix computations is imported from the SPF computation results of the main ISIS instance. Accordingly, there is no net increase in the amount of computation even though multiple ISIS instances are being used.

A device in the core of the network currently, from a packet forwarding point of view, needs to know how to reach each other node in the network. Each other node in the network has a lot of routes that point to devices or networks external to it. The devices in the core do not need to know about the external routes. From a data plane point of view, the devices in the core do not have forwarding tables for anything outside the network. To provide a transmit function in the network; SPB only requires address records and forwarding records that represent nodes in the network. The core devices do not need to know address sand routing information for devices, routes or anything outside the network. The SPB forwarding plane is therefore unchanged.

There are two types of information in the network that get propagated that apply to a control plane of a device. One type occurs when there is a change in the network, e.g. the graph of the network changes or the cost of a link changes. Another kind is for a new route or new address or prefix at an edge of the network. This information has to be propagated to other edge devices through core devices, but is not required for the core devices. None the less, the core devices are tasked with forwarding this information. The control planes on the core devices are taxed with this processing, even though the device itself does not need the information. In cases where there is a lot of chatter at the edge nodes (devices joining, devices leaving, routes being learned or aged out etc.) this provides a large burden to the control plane processing of the core devices.

The challenge is to get the required information from one edge device to another without requiring the core nodes to process the information they will not use. Currently, the same control plane ISIS instance is used to get external information from one edge to another as is used for topology information in the core of the network. By breaking this up into separate functionality, improved performance can be achieved. For external information only required by the edge devices, for a given service, a multicast tree is formed, and the external information is propagated using this tree. ISIS uses the tree to exchange the edge information. The tree is used only to exchange edge to edge information, and is not used to compute shortest path information. The shortest path is already computed by the main instance of ISIS. No additional protocol is required.

While it is possible to run ISIS hellos on the multicast trees used in the VSN ISIS instances. It is not required. The main ISIS instance has information about the nodes participating in the VSN tree—and this can be used to infer static VSN adjacency information into the per VSN ISIS instances. This can relieve the load of having to run a hello protocol for each VSN. As a result the individual VSN ISIS instances can be used exclusively for exchanging routing information. The per VSN ISIS instances are automatically created when a VSN is created without requiring additional user intervention. This avoids the need to change operator workflow for VSN activations.

It should be noted that "minor" variations from this general theme are possible. What is presented here is the framework under which such choices are made. Routing updates on the individual VSN ISIS instances are carried on the multicast trees in the datapath. This means that changes in routing information at the edge propagates much faster at datapath speeds. The use of core device CPUs to relay of VSN routing information in the core is avoided. This reduces the load on the CPUs in the core switches. Routing information for a VSN is only delivered to those BEBs participating in the VSN. This allows for information isolation in the control plane. Each VSN has the full ISIS LSDB size of its instance available for itself. Accordingly, growth in routing information in one VSN does not restrict the number of routes that can be carried in another VSN. There is no need to assign separate TLV/sub-TLV types for VSN routes. Since the VSN is identified by the ISIS instance used for routing exchanges—ISIS TLVs standardized for the GRT can be used for VSNs as well.

The LSDB updates can be several different types of updates. These include ISIS TLVs used for IPv4 Unicast Routing information, ISIS TLVs used for IPv4 Multicast Routing information, ISIS TLVs used for IPv6 Unicast Routing information, ISIS TLVs used for IPv6 Multicast Routing information, ISIS TLVs used for MAC Table information, ISIS TLVs used for ARP Table information and the like.

Each VSN multicast tree uses the same System-Id as a default ISIS instance, does not carry internal topology updates, is not used in Shortest Path Forwarding (SPF) computations, is used only to advertize routes and streams specific to the VSN, and the Shortest Path Bridging Layer 1 (SPBL1) metric from the default ISIS instance is used to assign cost to the routes.

Figure 2:
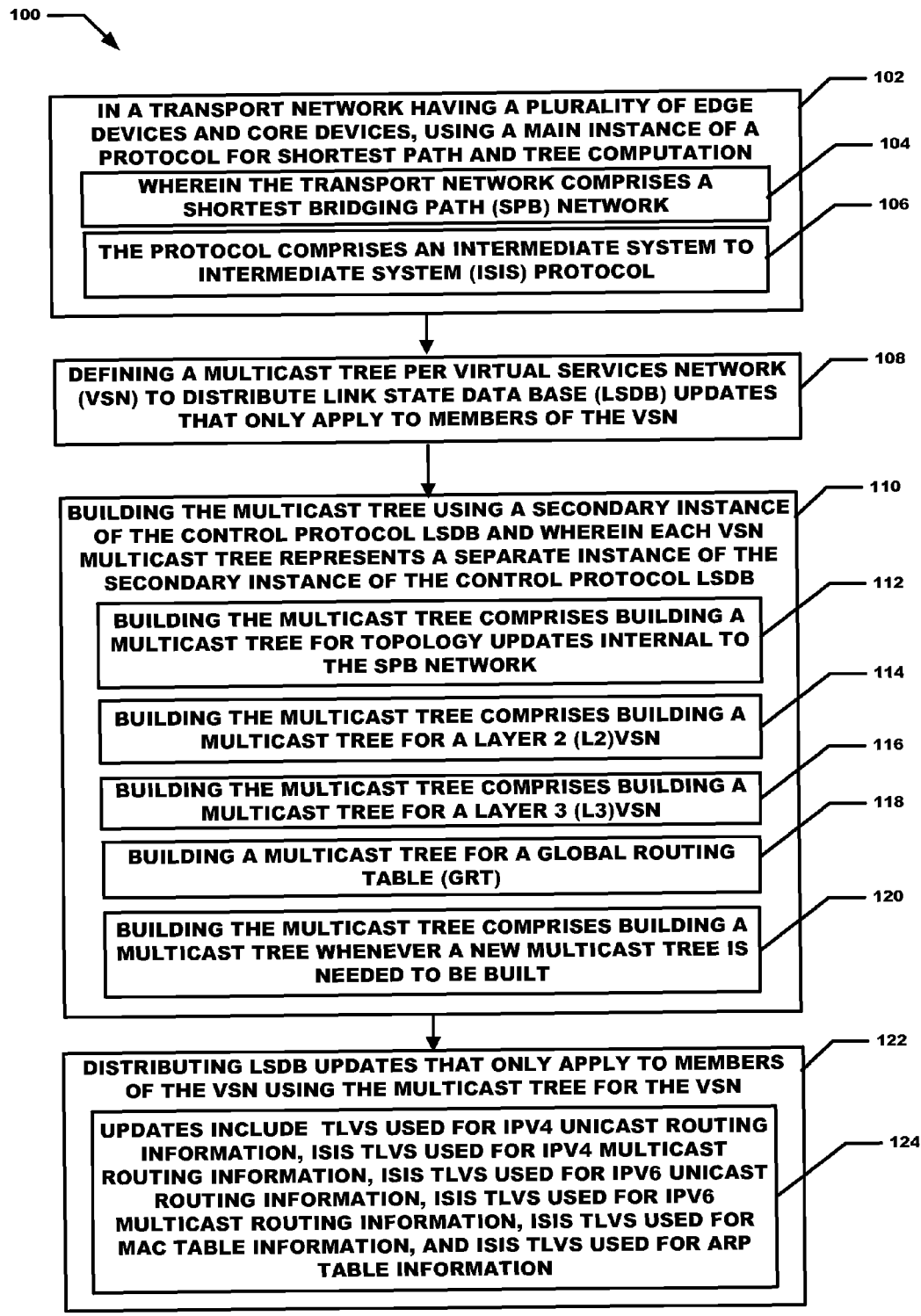
FIG. 2 illustrates a flow diagram of a particular embodiment of a method that provides virtualization and distribution of routing information used in transport networks in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for virtualization and distribution of routing information used in transport networks is shown. Method 100 begins with processing block 102 which discloses in a transport network having a plurality of edge devices and core devices, using a main instance of a protocol for shortest path and tree computation. As shown in processing block 104, in this embodiment the transport network comprises a Shortest Bridging Path (SPB) network. As also shown in processing block 106, protocol comprises an Intermediate System to Intermediate System (ISIS) protocol.

Processing block 108 states defining a multicast tree per Virtual Services Network (VSN) to distribute Link State Data Base (LSDB) updates that only apply to members of the VSN.

Processing block 110 recites building the multicast tree using a secondary instance of the control protocol LSDB and wherein each VSN multicast tree represents a separate instance of the secondary instance of the control protocol LSDB. Processing block 112 shows wherein the building the multicast tree comprises building a multicast tree for topology updates internal to the SPB network. Processing block 114 discloses building the multicast tree comprises building a multicast tree for a Layer 2 (L2) VSN. Processing block 116 states wherein the building the multicast tree comprises building a multicast tree for a Layer 3 (L3) VSN. Processing block 118 recites wherein the building the multicast tree comprises building a multicast tree for a Global Routing Table (GRT), and processing block 120 discloses wherein the building the multicast tree comprises building a multicast tree whenever a new multicast tree is needed to be built.

Processing continues with processing block 122 which states distributing LSDB updates that only apply to members of the VSN using the multicast tree for the VSN. As shown in processing block 124 updates include at least one of the group comprising ISIS TLVs used for IPv4 Unicast Routing information, ISIS TLVs used for IPv4 Multicast Routing information, ISIS TLVs used for IPv6 Unicast Routing information, ISIS TLVs used for IPv6 Multicast Routing information, ISIS TLVs used for MAC Table information, and ISIS TLVs used for ARP Table information.

The above-described method provides virtualization and distribution of routing information used in transport networks that does not increase the computational load on the SPB control plane relative to current SPB designs. The method also preserves the operational simplicity of SPB (e.g., a single protocol for all services, minimal configuration). The presently described method further significantly lifts the LSDB size limitations, while also allowing routing information for a VSN customer to grow without restricting available LSDB space for other customers. Further, the present method eliminates needless control plane chatter in the network.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer-implemented method in which a computer system performs operations comprising:
   in a transport network having a plurality of edge devices and core devices, using a main instance of a protocol for shortest path and tree computation;
   defining a multicast tree per Virtual Services Network (VSN) to distribute updates to a primary instance of a control protocol Link State Data Base (LSDB) that only apply to members of said VSN, wherein said VSN virtualizes network devices and services and is used to connect users to distinct application services;
   building said multicast tree using a secondary instance of said control protocol LSDB and wherein each VSN multicast tree represents a separate instance of said secondary instance of said control protocol LSDB and wherein each said VSN multicast tree built using said secondary instance of said control protocol LSDB does not carry internal topology updates; and
   distributing LSDB updates that only apply to members of said VSN using said multicast tree for said VSN.

2. The method of claim 1 wherein said transport network comprises a Shortest Bridging Path (SPB) network.

3. The method of claim 2 wherein said protocol comprises an Intermediate System to Intermediate System (ISIS) protocol.

4. The method of claim 3 wherein said building said multicast tree comprises building a multicast tree for a Layer 2 (L2) VSN.

5. The method of claim 3 wherein said building said multicast tree comprises building a multicast tree for a Layer 3 (L3) VSN.

6. The method of claim 3 wherein said building said multicast tree comprises building a multicast tree for a Global Routing Table (GRT).

7. The method of claim 3 wherein said building said multicast tree comprises building a multicast tree whenever a new multicast tree is needed to be built.

8. The method of claim 1 wherein said updates include at least one of the group comprising ISIS TLVs used for IPv4 Unicast Routing information, ISIS TLVs used for IPv4 Multicast Routing information, ISIS TLVs used for IPv6 Unicast Routing information, ISIS TLVs used for IPv6 Multicast Routing information, ISIS TLVs used for MAC Table information, and ISIS TLVs used for ARP Table information.

9. A non-transitory computer readable storage medium having computer readable code thereon for providing virtualization and distribution of routing information used in a transport network, the medium including instructions in which a computer system performs operations comprising:
   in a transport network having a plurality of edge devices and core devices, using a main instance of a protocol for shortest path and tree computations;
   defining a multicast tree per Virtual Services Network (VSN) to distribute updates to a primary instance of a control protocol Link State Data Base (LSDB) that only apply to members of said VSN, wherein said VSN virtualizes network devices and services and is used to connect users to distinct application services;
   building said multicast tree using a secondary instance of said control protocol LSDB and wherein each VSN multicast tree represents a separate instance of said secondary instance of said control protocol LSDB and wherein each said VSN multicast tree built using said secondary instance of said control protocol LSDB does not carry topology updates: and
   distributing LSDB updates that only apply to members of said VSN using said multicast tree for said VSN.

10. The non-transitory computer readable storage medium of claim 9 including instructions wherein said transport network comprises a Shortest Path Bridging (SPB) network.

11. The non-transitory computer readable storage medium of claim 10 including instructions wherein said protocol comprises an Intermediate System to Intermediate System (ISIS) protocol.

12. The non-transitory computer readable storage medium of claim 11 including instructions wherein said building said multicast tree comprises building a multicast tree for a Layer 2 (L2) VSN.

13. The non-transitory computer readable storage medium of claim 11 including instructions wherein said building said multicast tree comprises building a multicast tree for a Layer 3 (L3) VSN.

14. The non-transitory computer readable storage medium of claim 11 including instructions wherein said building said multicast tree comprises building a multicast tree for a Global Routing Table (GRT).

15. The non-transitory computer readable storage medium of claim 11 including instructions wherein said building said multicast tree comprises building a multicast tree whenever a new multicast tree is needed to be built.

16. The non-transitory computer readable storage medium of claim 9 including instructions wherein said updates include at least one of the group comprising ISIS TLVs used for IPv4 Unicast Routing information, ISIS TLVs used for IPv4 Multicast Routing information, ISIS TLVs used for IPv6 Unicast Routing information, ISIS TLVs used for IPv6 Multicast Routing information, ISIS TLVs used for MAC Table information, and ISIS TLVs used for ARP Table information.

17. A computer system in a transport network having a plurality of edge devices and core devices, each of said edge devices and core devices comprising:
   a memory;
   a processor;
   a communications interface;
   an interconnection mechanism coupling the memory, the processor and the communications interface; and
   wherein the memory is encoded with an application providing virtualization and distribution of routing information used in a transport network, that when performed on the processor, provides a process for processing information, the process causing the computer system to perform the operations of:
   in a transport network having a plurality of edge devices and core devices, using a main instance of a protocol for shortest path and tree computation;
   defining a multicast tree per Virtual Services Network (VSN) to distribute updates to a primary instance of a control protocol Link State Data Base (LSDB) that only apply to members of said VSN wherein said VSN virtualizes network devices and services and is used to connect users to distinct application services;
   building said multicast tree using a secondary instance of said control protocol LSDB and wherein each VSN multicast tree represents a separate instance of said secondary instance of said control protocol LSDB and wherein each said VSN multicast tree bulk using said secondary instance of said control protocol LSDB does not carry internal topology updates; and
   distributing LSDB updates that only apply to members of said VSN using said multicast tree for said VSN.

18. The computer-implemented method of claim 1 wherein each said VSN multicast tree built using said secondary instance of said primary control protocol LSDB is not used in Shortest Path First (SPF) calculations and only advertises routes specific to said VSN.

19. The non-transitory computer readable storage medium of claim 9 wherein each said VSN multicast tree built using said secondary instance of said primary control protocol LSDB is not used in Shortest Path First (SPF) calculations and only advertises routes specific to said VSN.

20. The computer system of claim 17 wherein each said VSN multicast tree built using said secondary instance of said primary control protocol LSDB is not used in Shortest Path First (SPF) calculations and only advertises routes specific to said VSN.

* * * * *